No. 741,042. PATENTED OCT. 13, 1903.
J. N. KAILOR & H. C. CLAY.
QUICK RELEASE BELT TIGHTENER.
APPLICATION FILED JUNE 15, 1903.
NO MODEL.
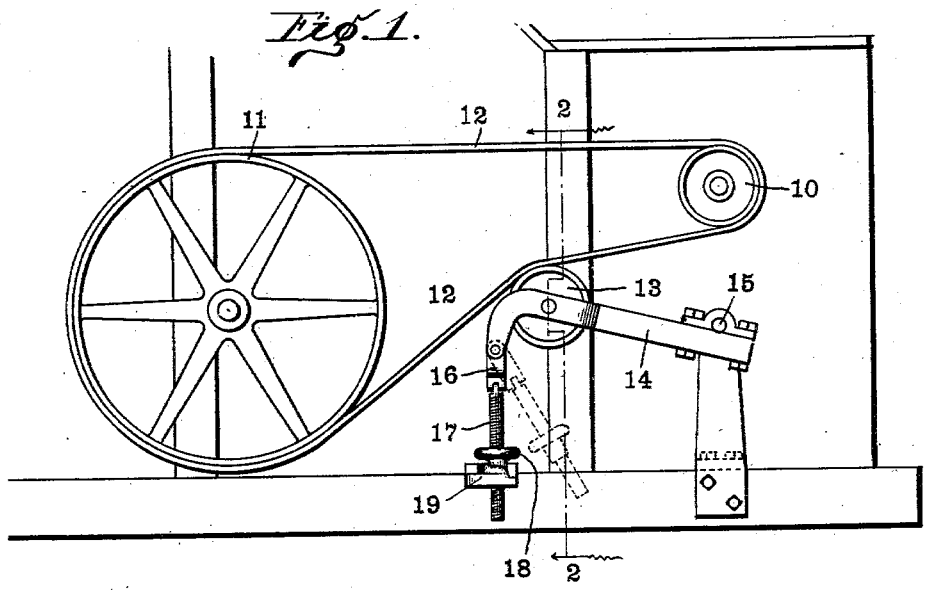
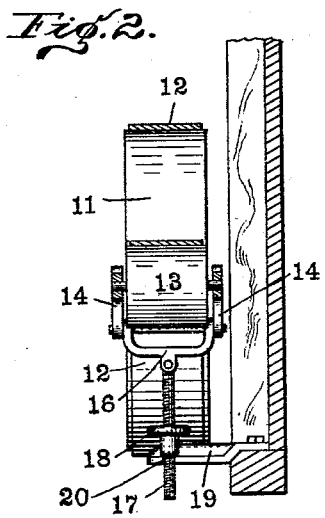
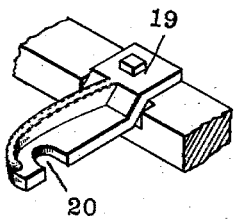
Witnesses
Frank A. Fahle
J. A. Walsh
Inventors
John N. Kailor
Harry C. Clay
By Bradford Hood
Attorneys No. 741,042. Patented October 13, 1903.

UNITED STATES PATENT OFFICE.

JOHN N. KAILOR AND HARRY C. CLAY, OF COLUMBUS, INDIANA, ASSIGNORS TO REEVES & COMPANY, OF COLUMBUS, INDIANA, A CORPORATION OF INDIANA.

QUICK-RELEASE BELT-TIGHTENER.

SPECIFICATION forming part of Letters Patent No. 741,042, dated October 13, 1903.

Application filed June 15, 1903. Serial No. 161,519. (No model.)

*To all whom it may concern:*

Be it known that we, JOHN N. KAILOR and HARRY C. CLAY, citizens of the United States, residing at Columbus, in the county of Bartholomew and State of Indiana, have invented certain new and useful Improvements in Quick-Release Belt-Tighteners, of which the following is a specification.

In the operation of a threshing-machine the separating-shoes are driven by a belt which is held in driving engagement with the pulley of the cylinder by means of an idler-pulley, the arrangement being such that by withdrawing said idler-pulley the shoes may be stopped independent of the cylinder.

The object of our invention is to provide a support for the idler-pulley by means of which it may be very quickly withdrawn, so as to thus quickly slacken the driving-belt and permit the shoes to stop.

The accompanying drawings illustrate our invention.

Figure 1 is a side elevation of our improved device; Fig. 2, a section on line 2 2 of Fig. 1, and Fig. 3 is a perspective detail of the supporting-bracket.

In the drawings, 10 indicates the pulley upon the end of the shaft of the usual threshing-cylinder; 11, the driven pulley; 12, the driving-belt, and 13 the idler. The idler 13 is journaled in an arm 14, pivoted upon pin 15 to swing in a plane parallel with the belt 12. Arm 14 is bifurcated at its outer end and the pulley 13 journaled between the fingers thereof, and pivoted to said fingers upon an axis parallel with the axis of the pulley 13 is a yoke 16. Pivoted to yoke 16 upon an axis at right angles to its axis is an adjusting-screw 17, upon which is threaded a hand-wheel nut 18. The nut 18 is adapted to be supported by a bracket 19, which is provided with a slot 20, adapted to receive screw 17.

In operation screw 17 may be swung into notch 20, with nut 18 resting upon bracket 19, and pulley 13 may be thrown up into engagement with belt 12, so as to tighten the same, by properly turning nut 18. Pulley 13 may also be gradually withdrawn from the belt; but the operator may, if he desires, grasp the lower end of screw 17 and pull said screw out of notch 20, so as to thus withdraw nut 18 from its position upon bracket 19, whereupon pulley 13 may drop quickly away from belt 12 and the belt thus become too loose upon pulley 11 to drive the same. As a consequence it is not necessary to slowly screw nut 18 upward upon screw 17 in order to withdraw idler 13 from engagement with the belt 12.

We claim as our invention—

1. A belt-tightening idler and support therefor, consisting of a pivoted arm, an idler journaled thereon, an adjusting-screw pivoted to said arm, a nut carried thereby, and a notched bracket adapted to receive the screw and support the nut, substantially as and for the purpose set forth.

2. In a belt-tightening-idler construction, the combination, with the idler, of a support therefor, means for adjusting the length of said support, and a bracket arranged to receive the thrust of said support, the connection between said support and the bracket being such that the support may be readily disconnected from the bracket, for the purpose set forth.

In witness whereof we have hereunto set our hands and seals, at Columbus, Indiana, this 10th day of June, A. D. 1903.

JOHN N. KAILOR. [L. S.]
HARRY C. CLAY. [L. S.]

Witnesses:
HELEN J. HALBERT,
BERTHA L. HARRISON.